United States Patent [19]

Huebner et al.

[11] 3,897,819

[45] Aug. 5, 1975

[54] REGENERATOR FOR GAS TURBINE ENGINE

[75] Inventors: George J. Huebner, Bloomfield Hills; James H. Whitfield, Royal Oak, both of Mich.

[73] Assignee: Chrysler Corporation, Highland Park, Mich.

[22] Filed: Feb. 22, 1973

[21] Appl. No.: 334,554

[52] U.S. Cl. ................................... 165/8; 165/10
[51] Int. Cl. .............................................. F28d 19/00
[58] Field of Search ................................ 165/8, 10

[56] References Cited
UNITED STATES PATENTS
3,534,307  10/1970  Bracken, Jr. ......................... 165/9

*Primary Examiner*—Albert W. Davis, Jr.
*Attorney, Agent, or Firm*—Talburtt & Baldwin

[57] ABSTRACT

A rotatable drum type regenerator for an automobile gas turbine engine comprises a steel matrix of thin stock and a rim of thicker stock connected in radial sliding and sealing relationship at the hot axial end region to accommodate thermal cycling and to prevent rupture between the rim and matrix, and positively connected by brazing at the cooler axial end region to withstand the various forces therebetween.

9 Claims, 10 Drawing Figures

PATENTED AUG 5 1975　　SHEET　1　　3,897,819

3,897,819
PATENTED AUG 5 1975
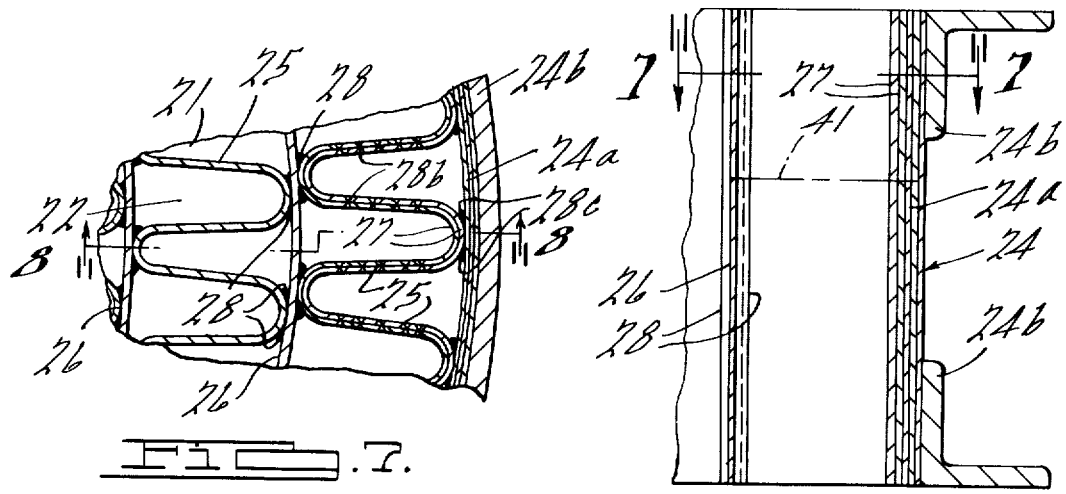
FIG. 7.
FIG. 8.
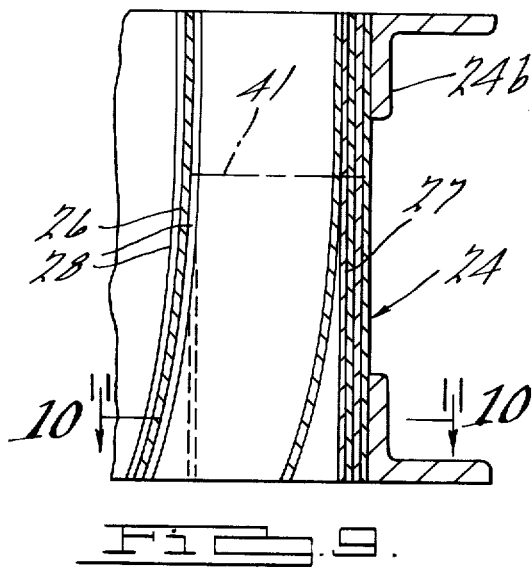
FIG. 9.
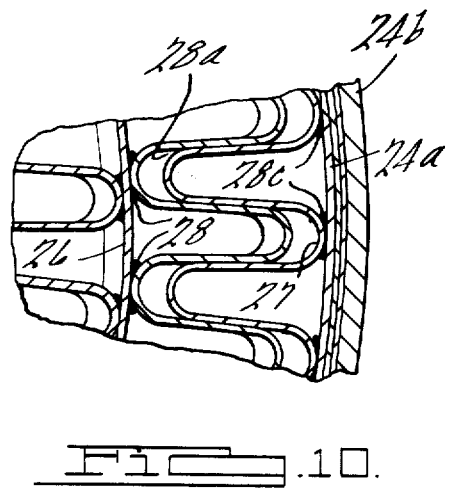
FIG. 10.

REGENERATOR FOR GAS TURBINE ENGINE

BACKGROUND AND SUMMARY OF THE INVENTION

In a typical drum type regenerator, a matrix comprising a multitude of axially extending thin-walled gas passages of small hydraulic diameter is secured at its boundary to a rim of comparatively thick material. The assembly is thus rotatable as a unit and the rim which may be located at either the central hub or outer periphery of the matrix readily takes the driving load.

Suitable baffles and seals direct comparatively cool high pressure inlet combustion supporting air axially in one direction through the rotating regenerator at one location to preheat the inlet air. Fuel is burned in the pre-heated inlet air and the resulting hot gases are discharged through the turbine stages and then directed in the axially opposite direction at another location through the rotating regenerator to heat the same. An axial temperature gradient is thus maintained across the regenerator during operation.

In consequence of the cyclic nature of operation of an automobile gas turbine engine, the juncture between the matrix and rim is subject to severe thermally induced stress in addition to other loads resulting from mechanical and pressure forces during operation. The thin walls of the matrix gas passages respond rapidly to temperature changes whereas the relatively more massive rim, or peripheral portions of the matrix protected by seals, responds more slowly to temperature changes. At the beginning of a temperature or power cycle, rapid thermal expansion of the matrix crushes the latter against the cooler and slower to expand rim. During the next cooling cycle after the rim has attained its operating temperature and has expanded thermally, the compacted matrix material adjacent the rim contracts and pulls away from the expanded rim, which cools and contracts more slowly.

The repeated flexing stresses combined with other forces resulting from the gas pressure differential across the customary seals and the frictional resistance of the seals rubbing against axially opposite ends of the rotating regenerator, result in extensive rupture and circumferentially elongated cracks between the matrix and rim especially near the hot axial end surface of the regenerator where the maximum differential thermal expansion and contraction occurs with consequent circumferential leakage of gases across the seals which separate the aforesaid cool high pressure inlet air from the hot and lower pressure exhaust gases. A portion of the inlet gases thus bypass the regenerator and the turbine stages to the extent that the loss in engine efficiency becomes intolerable.

Prior attempts to overcome the problem described have only been partially successful with a metal regenerator having a comparatively large coefficient of thermal expansion. In order to achieve regenerator efficiency, the matrix must comprise thin stock, such that even a matrix of expensive stainless steel cannot withstand the forces involved when manufactured in accordance with customary practice. Attempts to use heavier gage material at the peripheral portions of the matrix adjacent the rim merely displace the flexing and rupture to the adjacent thinner gage material.

An object of the invention is to provide an improvement in the concept of a gas turbine regenerator of the type illustrated in U.S. Pat. No. 3,534,807 having a sliding juncture between the matrix and rim allow thermal and contraction of the periphery of the matrix freely relative to the rim. In such structures, the gas pressure differential across the customary seals, known as cross arm seals and arranged generally diametrically across opposite axial faces of the regenerator, result in extremely large localized cyclic shearing forces between the rim and matrix adjacent opposite ends of the cross arm seals, which in cooperation with the aforesaid thermal and frictional forces rupture the juncture between the matrix and rim.

Another object is to provide practical means for accommodating the aforesaid forces and to avoid the specific rupture problem encountered with the sliding juncture of the type described, wherein the sliding juncture is confined to approximately the hotter half or three-quarter of the axial length of the regenerator, thereby to obtain a rugged unitary matrix and rim combination having exceptional durability and an acceptable operating life when subject to operating forces.

Other objects are to provide such a regenerator which may be economically and comparatively easily fabricated without sacrificing structural requirements imposed by operating forces on the regenerator and without adding gas leakage paths between high and low pressure regions of the matrix.

Another and more specific object is to provide such a regenerator wherein the flexible connection may be formed with the periphery of the matrix and rim in close engagement prior to operation, such that the matrix will crush on expansion and yield against the rim as heretofore, but wherein the flexible connection will accommodate the subsequent contraction of the matrix without causing rupture and leakage; or in the alternative to provide such a regenerator wherein the flexible connection freely spaces the rim and matrix prior to operation, such that on expansion the matrix will close the space between itself and the rim without appreciably crushing the matrix against the rim. On the subsequent contraction of the matrix, the rim and matrix will return substantially to their initial spaced positions.

Still another object is to provide an improved method of manufacturing and using a regenerator of the type described having a radially sliding juncture between the rim and matrix throughout the major axial extent of the latter measured from the hot face and having a comparatively rigid juncture between the rim and matrix throughout the remaining axial extent of the matrix.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 7 is a view similar to FIG. 4, showing a modification of the brazed juncture between the rim and matrix adjacent the latter's cool face prior to the initial thermal expansion, wherein the convolutions at the juncture are pressed into closely interfitting relationship during the initial fabrication of the regenerator.

FIG. 8 is a sectional view taken in the direction of the arrows substantially along the line 8—8 of FIG. 7.

FIG. 9 is a view similar to FIG. 8, showing the cooled juncture between the rim and matrix after the first thermal cycle, the radially sliding portions of the cooled juncture being thermally contracted radially relative to the rim after having been thermally stressed and compacted radially against the rim during the preceding hot period of the thermal cycle.

FIG. 10 is a sectional view taken in the direction of the arrows substantially along the line 10—10 of FIG. 9.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENTS

Figure 1:
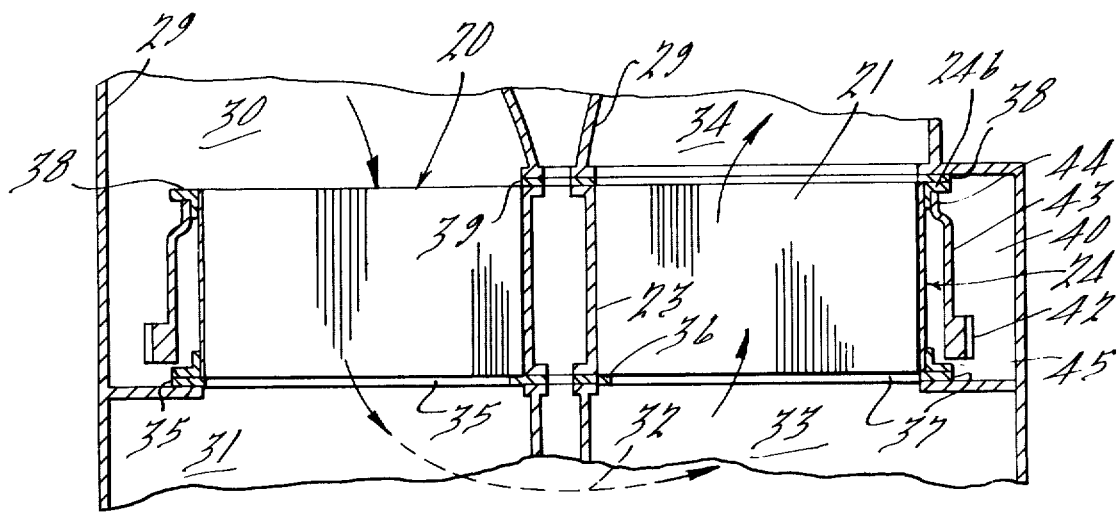
FIG. 1 is a fragmentary diagrammatic cross section through a gas turbine engine at the region of the regenerator embodying the present invention.
Figure 2:
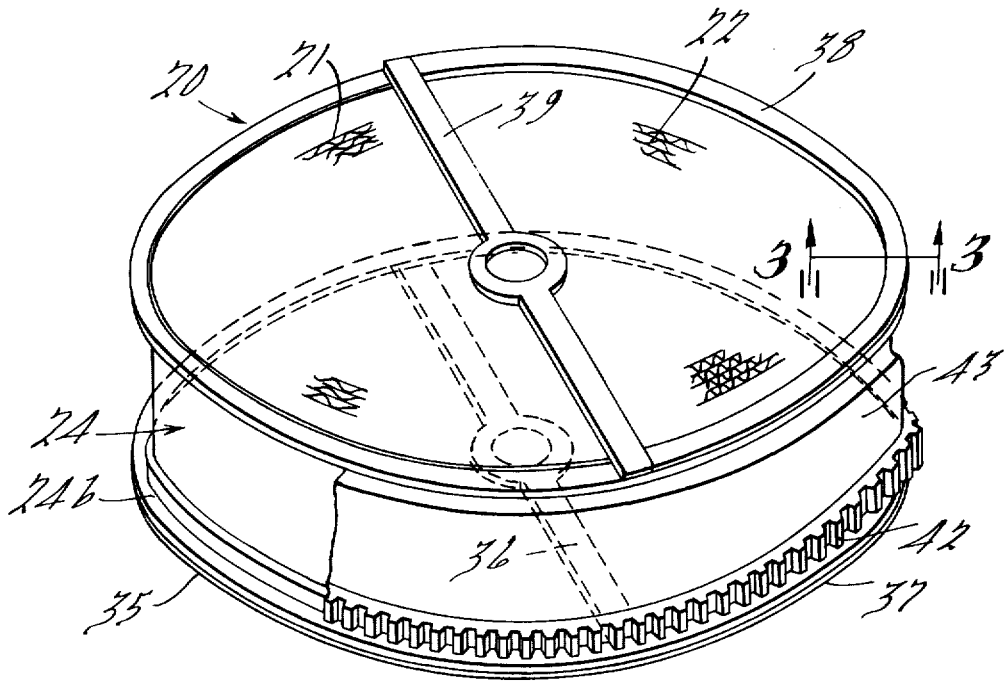
FIG. 2 is a diagrammatic isometric view showing the regenerator and seals separated from the engine structure.
Figures 3, 4:
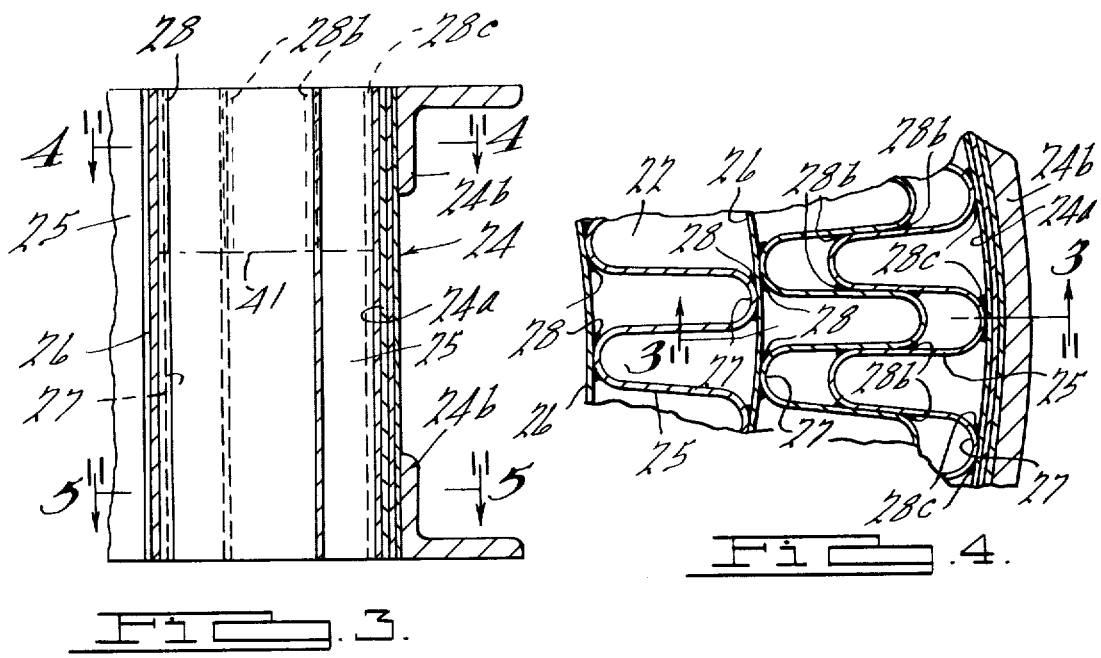
FIG. 3 is a enlarged fragmentary section taken in the direction of the arrows substantially along the line 3—3 of FIGS. 2 and 4 showing the assembled regenerator matrix and rim prior to thermal deformation, the driving ring gear being omitted.
FIG. 4 is a sectional view taken in the direction of the arrows substantially along the line 4—4 of FIG. 3 showing the brazed portion of the rim and matrix juncture adjacent the matrix cool face prior to thermal distortion.

Referring in particular to FIGS. 1 through 6, a rotatable drum type regenerator 20 for an automobile gas turbine engine is shown comprising an annular matrix 21 of thin-walled axial gas passages 22, FIG. 4, bounded by an inner rim or hub 23 and an outer coaxial flanged rim 24. The gas passages 22 are elongated radially as illustrated in FIG. 4 and are formed by means of a plurality of sheet steel convolutions 25, each arranged circumferentially and spaced radially from a similar sheet of convolutions 25 by a sheet steel strip 26 in contact tangentially with the adjacent bases 27 of the convolutions 25. The convoluted and spacer strips 25 and 26 preferably extend either circularly or spirally around the hub 23 and are secured together at their regions of contact, as for example, by copper brazing 28.

Figures 5, 6:
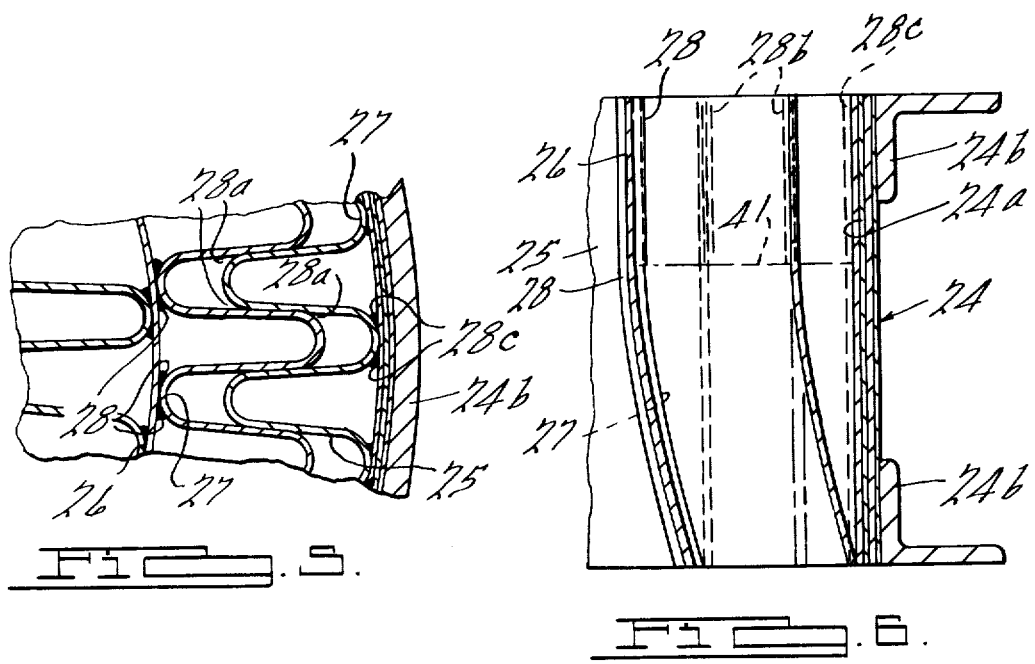
FIG. 5 is a view similar to FIG. 4, but taken in the direction of the arrows substantially along the line 5—5 of FIGS. 1 and 3, showing the unbrazed portion of the sliding juncture between the rim and matrix adjacent the latter's hot face prior to thermal distortion.
FIG. 6 is a view similar to FIG. 3 but showing the deformed sliding juncture during the initial hot period of a thermal cycle, the hot matrix being thermally expanded radially relative to the cooler rim.

No spacer 26 is provided between the last two outermost convolutions 25 adjacent the rim 24, which thus comprise convoluted inner and outer sealing members of the matrix joining the same to the rim. The convolutions 25 of the outermost spiral or member are caused to interfit with the convolutions 25 of the adjacent radially inward spiral or member as illustrated in FIGS. 4 and 5. A terminal portion of the sheet steel strip in which the convolutions 25 are otherwise formed may be wrapped in a non-convoluted condition several times around the periphery of the matrix to provide the base 24a of the outer rim 24, to which the comparatively heavy gage steel upper and lower annular L-section flanges 24b are welded adjacent the axially opposite regenerator faces of the matrix 21 to complete the rim 24. Similarly to the brazing 28 between the bases 27 and strip 26, the bases 27 of the radially outermost convolutions are brazed at 28c to the inner surface of rim portion 24a, the brazing 28 and 28c extending the full axial length of the matrix.

Each gas passage 22 comprises a channel or convolution 25 extending axially for the full axial dimension of the regenerator matrix 21, the mouth of each channel 25 opening in the radially opposite direction from the mouth of the next circumferentially adjacent channel 25 and being closed by the associated spacer strip 26. The strips 25 and 26 are preferably less than 0.002 inch thick and may be several inches in axial length. In a typical situation, the cross-sectional dimensions of each gas passage are on the order of magnitude of 0.01 inch circumferentially and about 0.125 inch radially to provide as much heat exchange area as feasible in a regenerator of convenient size.

The regenerator 20 is mounted for rotation about the axis of its hub 23 within an engine housing 20 which includes suitable baffles for directing comparatively cool high pressure inlet air to a comparatively cool region 30 confronting the upper left face of the regenerator 20, FIG. 1, from which the inlet air flows downwardly in the direction of the arrows through the matrix 21 in heat exchange relationship with the sidewalls of the gas passages 22 to a comparatively high temperature region 31 at the lower left face of the regenerator 20. The inlet air is thus preheated as it flows through the hot matrix 21 from the region 30 to the region 31.

The preheated inlet air is conducted from the region 31 through a combustion chamber and the turbine rotor stages of the engine, as indicated schematically by the dotted arrow 32, to provide engine motive power. From the turbine stages 32, the hot exhaust gas is directed to the region 33 confronting the lower right face of the regenerator, FIG. 1, and is then conducted upwardly in heat exchange relationship through the gas passages 22 to heat the same, whereupon the cooled exhaust gases are exhausted to the atmosphere from the comparatively cool portion 34 at the upper right face of the regenerator 20.

In order to direct the gas flow as described, a C-shaped seal 35 underlies the lower left portion of the rim 24 and extends circumferentially around the hot underside of the regenerator 20, FIGS. 1 and 2, to a lower cross arm seal 36. The latter extends generally diametrically across the lower hot face of the regenerator and bifurcates at the central rim or hub 23. The seals 35 and 36 are fixed and are carried by fixed portions of the engine housing 29 in sliding and sealing engagement with mating portions of the underside of the regenerator matrix 21 and rim 24 to prevent high pressure inlet air from by-passing the regenerator 20 and to direct the inlet air through the matrix 21 from region 30 to region 31.

Similar C-shaped fixed seals 37 and 38 carried by fixed portions of the housing 29 are in sliding and sealing engagement with the rim and matrix at the lower right hot and upper right cool surfaces respectively to guide the exhaust gases through the matrix 21 from region 33 to region 34 and also to prevent admixing of the hot low pressure exhaust gases with the cooler high pressure inlet air. The seal 37 cooperates with the cross arm seal 36 to enclose the lower hot surface of the regenerator confronting the region 33. Seal 38 cooperates with an upper fixed cross arm seal 39 to enclose the upper cool surface of the regenerator 20 confronting the region 34. The seal 39 is also carried by fixed portions of the housing 29 and is in sliding and sealing engagement with the upper cool surface of the matrix 21 overlying the lower cross arm seal 36. A portion of the engine housing 29 around the regenerator 20 provides an annular chamber 40 in communication with the cool high pressure inlet air at region 30, thereby to bathe the circumference or regenerator 20 in cool air and to insulate the regenerator from exterior walls of the housing 29.

In its passage between the regions 30 and 31, the inlet air is heated by contact with the sidewalls of the gas passages 22. In the passage of the exhaust gases between the regions heated and 34, the sidewalls of the regenerator passages 22 are heated by these gases. The exhaust entering region 34 is thus comparatively cool prior to being exhausted to the atmosphere. By virtue of the rotating regenerator 20, the hot portions are continually rotated across the seals 36 and 39 from the exhaust region to the inlet region, thereby to render the gas turbine engine economically feasible by utilizing exhaust heat to preheat the inlet air.

The thin sidewalls of the matrix gas passages 22 attain their operating temperatures in a manner of seconds by virtue of their heat exchange relationship with the gas flow, but the comparatively thick rims 23 and 24, shielded from direct contact with the gas flow by the seals 35-39, frequently require a matter of minutes to attain their operating temperatures. In consequence, during a power demand from the engine, the temperature of the matrix 21 rapidly rises especially adjacent its hot face confronting the regions 31 and 33. Without some provision to the contrary, the matrix is caused to expand thermally against the slow-to-heat rims 23 and 24 and is thereby crushed against the latter. During the subsequent cooling phase the matrix 21 cools and contracts rapidly before the rims 23 and 24 cool appreciably. Thus while the rim 24 in particular is expanded, the matrix 21 tends to pull radially inwardly from that rim. After repeated cycles, the bond between the matrix 21 and the rim 24 when constructed according to conventional practices, tends to rupture and an extensive circumferentially extending crack between the matrix 21 and rim 24 develops, especially adjacent the hot face of the regenerator 20 confronting the regions 31 and 33. The rupturing forces are more severe adjacent rim 24 than adjacent rim 23 because the larger dimensions of rim 24 allow greater distortion and also because the rim 24 is cooled by the air in chamber 40 to effect a greater temperature differential with respect to matrix 21.

FIGS. 3 through 6 show details of one embodiment of the present invention wherein a flexible connection between the rim and matrix is provided throughout a substantial axial extent thereof from the lower hot surface, as for example throughout between approximately 50 to 75 percent of the axial length of the regenerator to prevent the above described rupturing. During fabrication of the regenerator 20, the spiral windings 25 and 26 of the matrix 21 are wound around the hub 23 as aforesaid and the bases 27 of the convolutions 25 are brazed throughout the entire axial length of the matrix 21 to the adjacent tangential strips 26 at 28 and to the rim portion 24a at 28c by dipping the entire matrix in a copper brazing solution. The copper adheres by capillary action as at 28 and 28c to the converging portions of the convolutions 25 and strip 26 or rim portion 24a.

In the present instance, prior to the brazing operation, a brazing preventative known to the trade as a stop-off is applied at the junctures and regions of convergence 28a of the two radially outermost strips of convolutions 25 from the bottom hot face of the matrix 21, FIG. 3, to the level indicated by the line 41. The latter will be at least 50 percent of the axial length of the regenerator 20 from the hot face and usually 60 percent to 75 percent of that axial length. Thus during the subsequent brazing operation, the convolutions 25 of the radially outer strip where stop-off is applied at 28a will not be brazed to the adjacent radially inner convolutions 25, thereby to effect a radially sliding juncture between these convolutions, FIGS. 5 and 6, throughout at least the aforesaid 50 percent and preferably 60 percent to 75 percent of the axial length of the regenerator 20 from the hot face. Where no stop-off is applied, i.e. throughout the remaining upper 25 to 40 percent of the axial length of the matrix in the preferred case as illustrated in FIGS. 3 and 4, the radially outer two strips of convolutions 25 will be brazed solidly together at 28b.

In consequence at least 25 percent of the axial length of the two radially outer strips of convolutions 25 measured from the upper cool face, will be positively brazed together to provide the necessary strength to withstand the pressure forces applied to the matrix, especially adjacent the rim 24 at the ends of the seals 36, 39, and the mechanical forces including frictional forces opposing rotation of the matrix, such as friction between the matrix 21 and the seals 35, 36, 37 and 39.

Consideration of the above described sliding juncture 28a between the lower hot portions of the two radially outermost strips or spirals of convolutions 25 will now facilitate understanding of a major pressure force tending to shear the matrix 21 circumferentially from the rim 24. The pressure differential between the comparatively high pressure inlet air flowing downwardly through the matrix 21 at the left side of the seals 36 and 39 and the comparatively low nearly atmospheric pressure of the exhaust gases flowing upwardly through the matrix at the right side of the latter seals, FIG. 2, results in a pressure differential across the seals 36 and 39 amounting to approximately 45 PSI in a typical operating situation. This pressure differential is applied against an area of the matrix approximating the latter's vertical mid-section in FIG. 1, which may for 16 be 16 inches in diameter and 3½ inches in axial length, tending to urge the matrix 21 from left to right in FIG. 1 against the rim 24 and to compact the two radially outermost interfitting strips of convolutions 25 at the right together, somewhat as illustrated in FIG. 7.

Inasmuch as all of the other convolutions 25 and strips 26 are brazed together throughout the axial length of the matrix, the major portion of the matrix is an integral structure and tends to move as a unit when subjected to the aforesaid pressure differential. In consequence, if the sliding juncture indicated at 28a in FIG. 5 is extended throughout the entire axial length of the regenerator as taught by the abovementioned U.S.

Pat. No. 3,534,807, most of the pressure force acting on an area approximately equal to the vertical midsectional area of the matrix and effective to move the integral structure of the matrix 21 from left to right in FIG. 1 would be unopposed except adjacent the opposite ends of the cross seals 36 and 39 where the sliding juncture has no component of movement from left to right.

The resulting localization of the above described pressure force would result in a shearing force between the matrix 21 and rim 24 at the junctures 28c on the order of magnitude of 50,000 PSI and in some instances much larger. The latter force is cyclic at a frequency determined by the speed of rotation of the regenerator 20 and in cooperation with the aforesaid thermal and frictional forces tends to shear the matrix 21 from the rim 24 at the junctures 28c. However, by virtue of the brazing 28b throughout at least the upper cooler quarter of the matrix 21, the above described pressure force, instead of being localized at the ends of the cross seals 36 and 39, is distributed around the entire circumference of the matrix throughout the axial extent of the brazing 28b, i.e. above line 41.

In the present instance the regenerator 20 is rotated by means of a ring gear 42 suitably secured to the lower end of an annular support 43 which in turn is secured to the upper rim flange 24b. The support is offset radially outwardly from its attachment at 44 with the flange 24b to provide a gap 45 to accommodate relative radial expansion and contraction between the hotter lower portion of the regenerator rim 24 and the cooler gear 42 that is bathed in the fresh inlet air within passage 40. By the structure described, rotation of the gear 42 by engine driven gear means, not shown, is imparted to the upper rim flange 24b and thence to the matrix 21 through the latter's completely brazed 28b portion above line 41, which provides the necessary strength to resist circumferential shearing forces between the rim 24 and matrix 21 during operation.

The juncture between the matrix 21 and rim 24 embodying the present invention may be initially fabricated prior to operation of the regenerator with the radially outer two spirals of convolutions 25 either compacted closely together as in FIG. 7, or alternatively may be initially fabricated with the convolutions 25 partially interfitting as in FIGS. 4 and 5. In either case, the same type of flexible connection described adjacent the rim 24 may also be employed between the matrix 21 and inner rim or hub 23 if desired.

In the FIGS. 3 through 6 type of construction, the two outermost convolutions 25 interfit only partially prior to engine operation, FIGS. 4 and 5. During the initial stage of each engine load or thermal cycle when the flow of hot exhaust gases through the matrix 21 accelerates, the matrix 21 will expand radially relative to the cooler rim 24 and the interfitting convolutions 25, particularly at the hotter lower portions of the matrix 21, and compact the unbrazed lower portions of the interfitting convolutions 25 adjacent the rim 24 into each other as illustrated in FIG. 6. Upon cooling, the matrix 21 will contract radially and the unbrazed convolutions 25 adjacent the rim 24 will return somewhat to the initial position of FIG. 5 without rupturing the brazing between the rim 24 and adjacent convolutions 25, or between the convolutions 25 and spacer strips 26. At the cooler upper region of the matrix, the relative thermal expansion and contraction is less pronounced and is accommodated by distortion and yielding of the matrix material without causing rupture at the brazed junctures 28b.

If the regenerator 20 is fabricated with the convolutions 25 initially compacted as in FIGS. 7 and 8, the portions of the interfitting convolutions 25 above line 41 will be brazed together at 28b as described above, and the portions 28a below line 41 will not be brazed together. This structure offers an advantage in fabrication because control of production tolerances is more readily maintained if the interfitting convolutions 25 of FIGS. 7 and 8 are intitially compacted, than if they are only partially compacted initially as in FIGS. 3-5. During the first operating thermal cycle of the regenerator, the matrix 21 will tend to expand and will be deformed and compacted against the cooler rim 24. Thereafter when the matrix 21 cools and contracts with respect to the rim 24, the interfitting convolutions 25 at the unbrazed hotter portions 28a of the matrix will separate as illustrated in FIGS. 9 and 10. The rim 24 and the peripheral portions of the matrix 21 may be permanently deformed during the first thermal cycle. However, during the next and subsequent thermal cycles, the matrix 21 will expand comparatively freely without asserting appreciably additional force against the rim 24 by virtue of the radially spaced sliding relationship between the unbrazed lower portions 28a of the convolutions 25 below line 41 resulting from the first cycle. The radially spaced portions of the convolutions 25 during successive hot cycles will return to the compacted interfitting position somewhat as shown in FIG. 8. It has been found that the partially interfitting relationship between the convolutions 25, FIGS. 9 and 10, may be repeatedly compacted and retracted during successive heating and cooling cycles without causing rupture. The brazed portions 28b of FIGS. 7-10 will behave in the manner of the corresponding portions described in regard to FIGS. 3-6.

In each of the modifications described, the partitions 26 may be sheet steel of a thickness and composition comparable to the thickness and composition of the sheet material of the convolutions 25. Stainless steel has been employed heretofore for the matrix 21. By virtue of the flexible coupling described between the matrix 21 and rim 23 or 24, more economical grades of carbon steel can now be used without rupturing in consequence of thermal cycling.

We claim:

1. In a rotatable regenerator for a gas turbine engine, a drum type matrix adapted during engine operation for flow therethrough in one axial direction of comparatively cool high pressure inlet air at one region and for flow therethrough in the opposite axial direction of comparatively hot low pressure exhaust gas at a second region to effect an axial temperature gradient in said matrix between axially opposed hot and cold faces thereof, a rim for said matrix, sealing means for securing said rim to said matrix at a fluid seal to prevent gas flow circumferentially therebetween and for accommodating cyclic thermal and pressure induced forces tending to rupture said seal comprising radially outer and inner circumferentially arranged sealing members positively secured to said rim and adjacent portion of said matrix respectively and interfitting at a plurality of circumferentially spaced locations in radially sliding fluid sealing relationship throughout the major axial extent of said matrix from said hot face, and means for distributing said pressure induced forces around the circumference of said matrix throughout the remaining axial extent thereof comprising securing means for positively securing said separate sealing members together throughout said remaining axial extent to prevent said radially sliding relationship thereat.

2. In the combination according to claim 1, said sealing members providing a plurality of circumferentially spaced radially opening channels extending axially of said matrix, the channels of one member interfitting radially within the channels of the other member to effect said radially sliding relationship, said securing means comprising means for positively securing the interfitting channels together throughout said remaining axial extent.

3. In the combination according to claim 2, said members comprising sheet metal and said securing means comprising brazing between juxtaposed portions of said members throughout said remaining axial extent.

4. In the combination according to claim 3, said members comprising strips convoluted to provide said radially opening channels, alternate channels opening in generally radially opposite directions.

5. In the combination according to claim 4, the bases of each pair of said interfitting channels being spaced radially prior to the initial operation of said regenerator to provide space to accommodate compacting of said bases together radially at the region of said matrix adjacent said hot face upon relative thermal expansion of said matrix with respect to said rim during operation.

6. In the combination according to claim 4, the bases of said interfitting channels being closely compacted prior to operation of said regenerator to effect radial compression and distortion of said interfitting channels upon the first heating and thermal expansion of said matrix with respect to said rim during operation.

7. In the combination according to claim 2, the bases of each piar of said interfitting channels being spaced radially prior to the initial operation of said regenerator to provide space to accommodate compacting of said bases together radially at the region of said matrix adjacent said hot face upon relative thermal expansion of said matrix with respect to said rim during operation.

8. In the combination according to claim 2, the bases of said interfitting channels being closely compacted prior to operation of said regenerator to effect radial compression and distortion of said interfitting channels upon the first heating and thermal expansion of said matrix with respect to said rim during operation.

9. In the combination according to claim 3, said remaining axial extent comprising at least a fourth of the total axial extent of said matrix.

* * * * *